United States Patent
Pringle

[11] 3,807,436
[45] Apr. 30, 1974

[54] CONTROL DEVICE FOR OVERHEAD SPRINKLER

[75] Inventor: Ray T. Pringle, Walla Walla, Wash.

[73] Assignee: Frontier Machinery Company, Walla Walla, Wash.

[22] Filed: Dec. 14, 1971

[21] Appl. No.: 207,920

[52] U.S. Cl. ............................... 137/344, 239/212
[51] Int. Cl. ........................... B05b 9/02, E01h 3/02
[58] Field of Search ............. 137/344; 239/212, 213

[56] References Cited
UNITED STATES PATENTS

| | | | |
|---|---|---|---|
| 3,394,729 | 7/1968 | Bower et al. | 137/344 |
| 3,147,764 | 9/1964 | Jensen | 137/344 |
| 3,386,661 | 6/1968 | Olson et al. | 137/344 X |
| 3,417,766 | 12/1968 | Purtell | 137/344 X |
| 3,587,763 | 6/1971 | Kinkead | 137/344 X |
| 3,598,142 | 8/1971 | Neier | 137/344 |
| 3,606,160 | 9/1971 | Bonds et al. | 137/344 X |
| 3,608,826 | 9/1971 | Reinke | 137/344 |
| 3,680,787 | 8/1972 | Sherman | 137/344 |
| 3,692,045 | 9/1972 | Carr | 137/344 |

*Primary Examiner*—Samuel Scott

[57] ABSTRACT

A control system for the electric motors which drive the individual carriages of a multi-carriage self-propelled sprinkling system. A switch is mounted adjacent a coupling on the main pipe and an arm pivotally supported above the coupling has one end in contact with the pipe length on the far end of the coupling and its other end in contact with a finger extending from a switch housing. The switch housing is of water-proof fiberglass construction and has the arm extending out the bottom of it so that the top can be completely water-proof.

18 Claims, 8 Drawing Figures

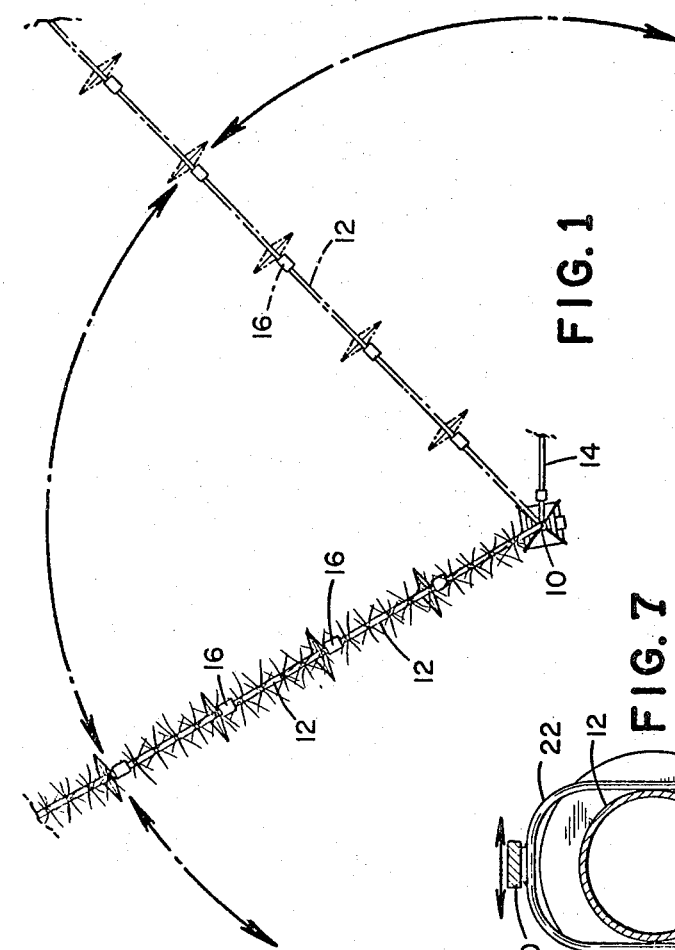
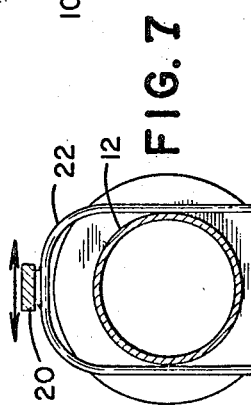
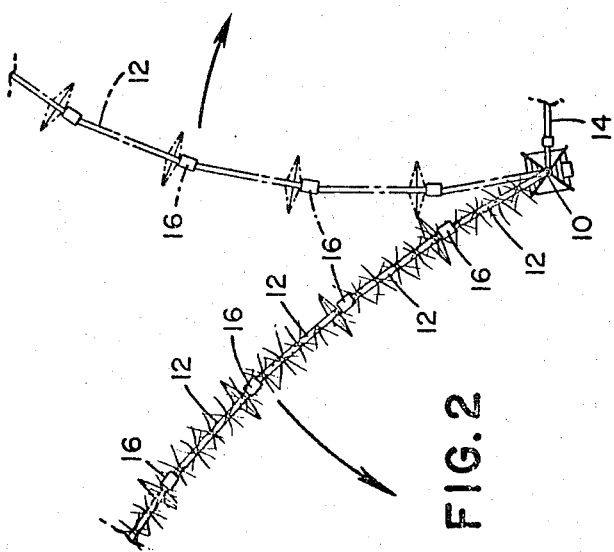
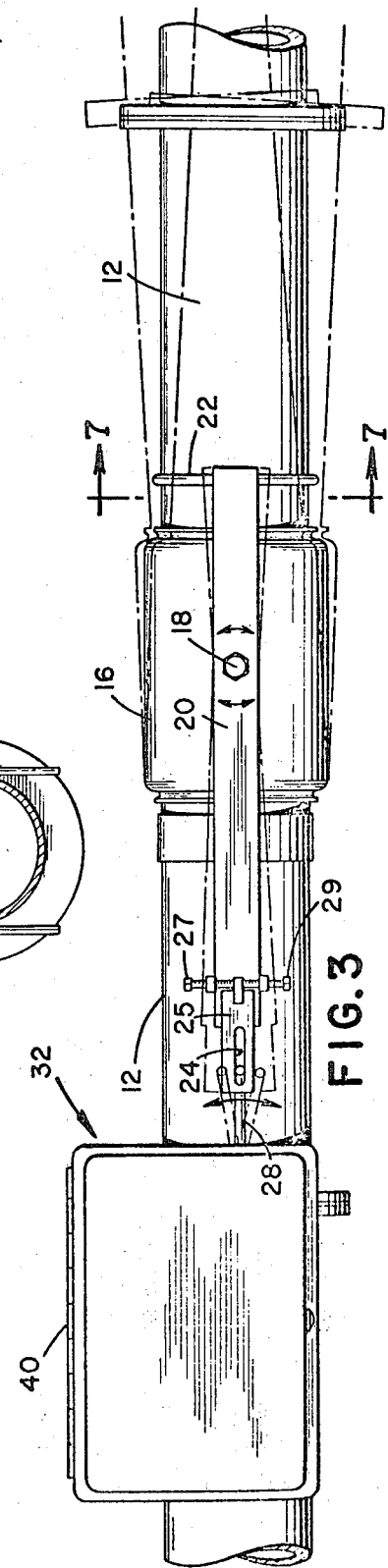

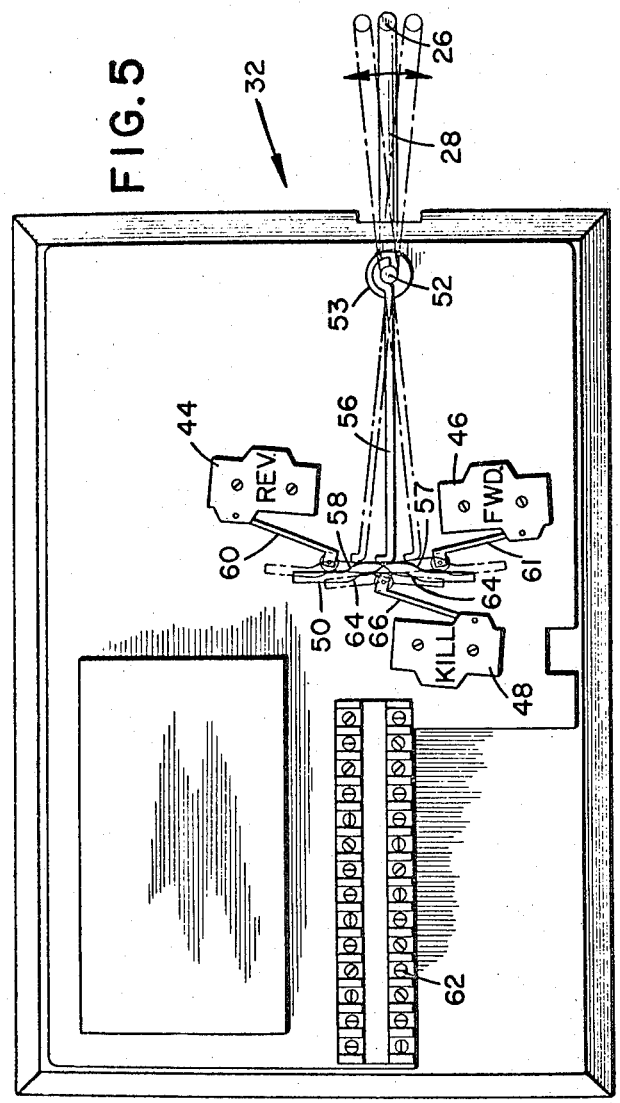
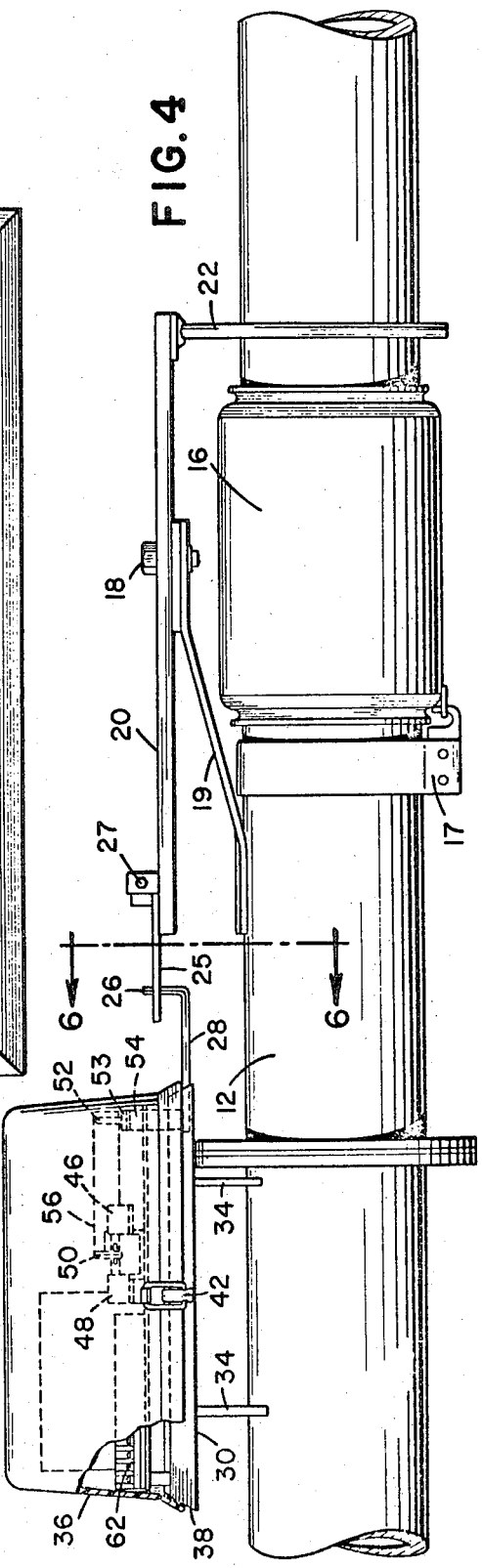
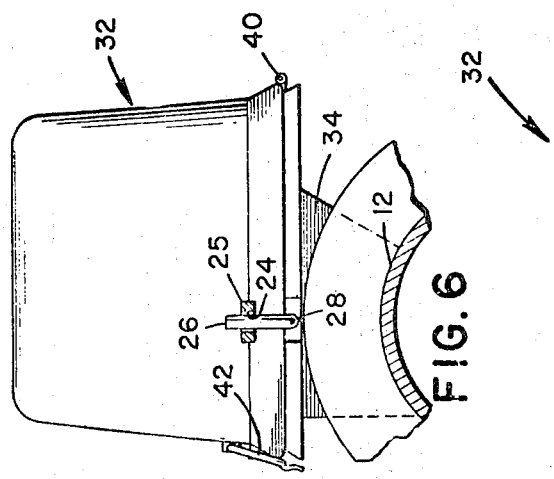

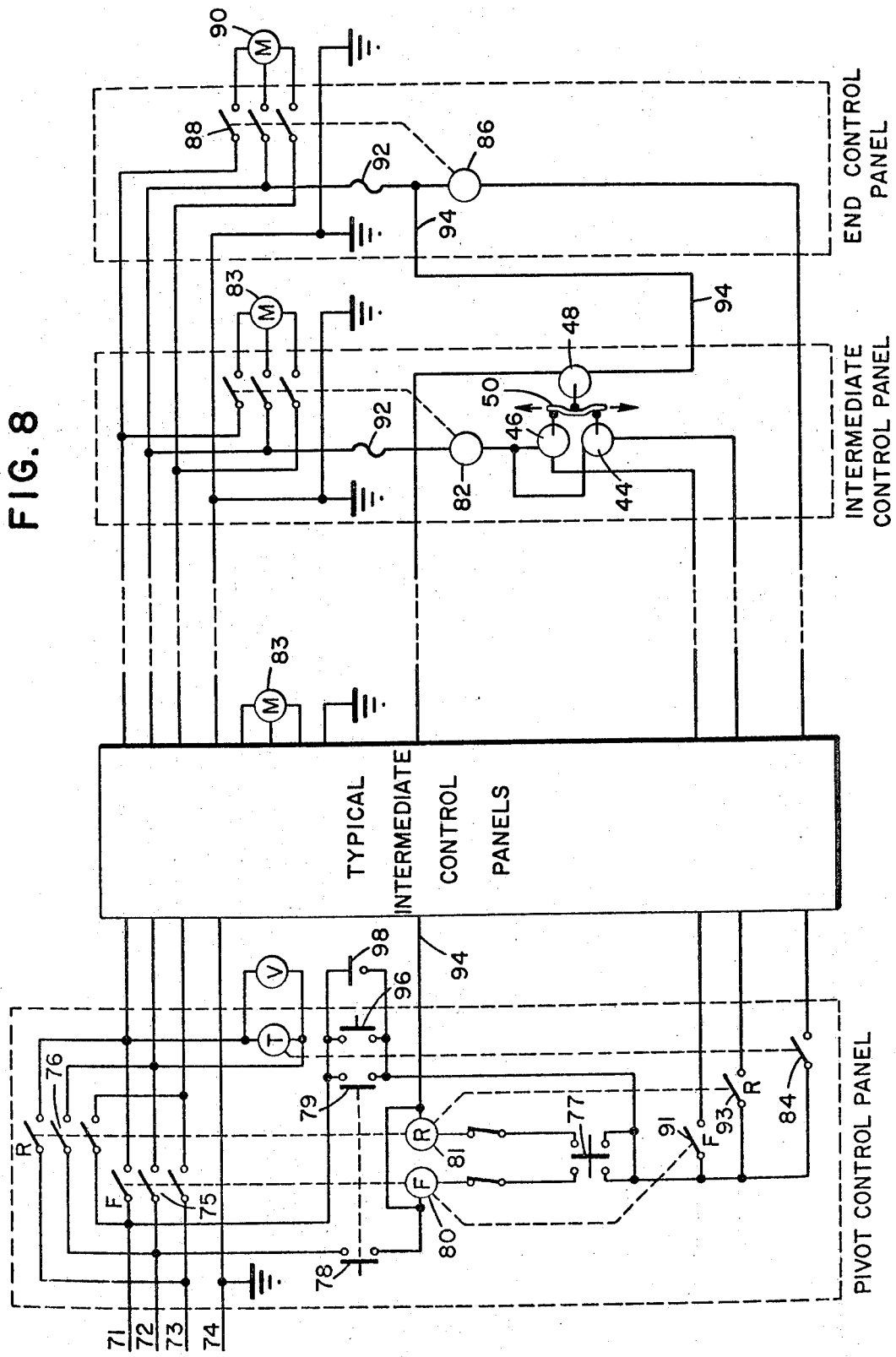

3,807,436

1

CONTROL DEVICE FOR OVERHEAD SPRINKLER

This invention relates to a self-propelled sprinkler system, and in particular to controls for the electric motors of the carriages of such systems. Sprinkler irrigation systems incorporate a series of wheel-supported carriages or towers which in turn support lengths of pipe carrying sprinkler heads. The wheels on each carriage are powered by an electric motor, those motors being fed from a central source, at the center of the circle about which the carriages pivot. The lengths of pipe supported between the carriages conduct water to the sprinkler heads and there is a coupling at each carriage, that coupling allowing some freedom of motion in alignment of the pipes. Since a typical system may be several hundred yards long, considerable difficulty is incurred in keeping the pipes in a straight line or in a circular path or in other preselected patterns. Typical systems are Pats., in various U.S. Pat., such as No. 3,394,729 to Bower and the other patents which are referred to in that specification. The problems incurred in maintaining alignment, especially over uneven terrain, are well described in these previous patents and, for the sake of brevity, that disclosure is hereby incorporated by reference.

A further problem, not fully appreciated by the prior art, is the problem with icing during freezing temperatures. Obviously, it is of vital importance to keep precise control of all of the drive motors in the carriages and when even one control ices up so as to permit that motor to run away with itself, the entire system will normally end up completely out of alignment with parts bent and considerable damage done.

Accordingly, it is an object of the present invention to provide a new and improved control system which will maintain the sprinkler pipes in close alignment to turn the carriage drive motors on and off automatically without being affected by the terrain over which the carriages are moving.

It is a further object of this invention to provide a control system which will not be adversely affected by changes in weather conditions, particularly freezing temperatures.

Another object of this invention is to provide a control system having a novel electrical circuit so that the entire system can be killed if one tower gets too far out of alignment.

Another object is to eliminate exposed control cables, pulleys and guides on such sprinkler switches.

Other objects and advantages of the present invention will become apparent upon a review of the attached drawings which show, by way of example and not of limitation, a preferred embodiment in which:

FIG. 1 is a plan view of a sprinkler system moving in an arcuate path over the ground;

FIG. 2 is a plan view similar to FIG. 1 but showing the problem in cumulative error in obtaining proper alignment if the carriages do not remain in control;

FIG. 3 is a plan view showing the switch housing and control lever mechanism of the present invention mounted on a sprinkler pipe;

FIG. 4 is an elevational view, partially broken away, of the mechanism shown in FIG. 3;

FIG. 5 is a plan view of the switch housing with the top cover removed;

FIG. 6 is a sectional view taken along lines 6—6 of FIG. 4;

FIG. 7 is a sectional view taken along lines 7—7 of FIG. 3;

FIG. 8 is a schematic wiring diagram of the present invention.

Turning now to the drawings in greater detail, it can be seen from FIGS. 1 and 2 that proper alignment is highly desirable and that it is also necessary that the end carriage travel considerably farther than the carriages closer to the pivot point, thus necessitating individual control so that the carriage motors farthest from the pivot point will run for longer periods and will shut off as soon as they are in alignment. The carriage motors close to the pivot point must, of course, run for a shorter time, shutting off sequentially as they achieve alignment.

After a given area has been sufficiently watered, the main line feeding all of the carriage motors is energized permitting the motors to run. The main control is from a pivot control panel located adjacent the pivot point 10. The water control valve is also located there, the water for the pipes 12 being supplied through a main feeder 14. The water will normally run continuously when an area is being sprinkled. The lengths of pipeline 12 are fastened together by couplings 16. Referring to FIG. 3, two lengths of pipe 12 are coupled together by a coupling 16, that coupling having a slip fit over the pipes and being constructed to permit a limited amount of movement in pivoting of the pipes within it without undue leakage. At the center of that coupling 16 is a pivot point 18 about which arm 20 may pivot. As shown in FIG. 4, the pivot point 18 is supported from a bracket 19 which may be welded or clamped to one of the pipes 12. The coupling is maintained against axial movement by a clamp 17.

At the right end of arm 20 as viewed in FIGS. 3 and 4, there is a substantially U-shaped saddle member which preferably contacts pipe 12 on each side so as to be sensitive to any movement of that pipe in a horizontal plane. Since the saddle is open at the bottom and has adequate clearance between the top of the pipe and the top of the saddle, it is not affected by vertical movement of the pipe and consequently vertical movement alone does not actuate the arm 20.

At the left end of arm 20 as viewed in FIGS. 3 and 4, there is an elongated opening 24 which encompasses an upturned end 26 of switch finger 28. Finger 28 extends horizontally under the base 30 of the control switch assembly 32, entering it from the bottom as will be described later in detail. That base is supported on brackets 34 which may be welded to the pipe. The end 25 of control arm 20 is movably mounted and may be adjusted toward one side or the other by tightening bolt 27 and loosening bolt 29 or vice versa. Alternatively, there may be a single threaded shaft with the end 25 being threadedly engaged with it.

The switch assembly 32 has a tightly fitting cover 36 which is made of plastic or reinforced fiberglass so as to avoid condensation inside the box. The base 30 has sloping sides 38 and has a hinge 40 along one side so that the cover can be completely opened to allow ready access for service. When closed, it is tightly held in place by lock 42.

Turning now to FIG. 5 which shows the inside of the control assembly (with the cover removed), three micro-switches 44, 46 and 48 are positioned to be actuated by a cam plate 50 having the general shape of a flattened "U." A vertical shaft 52 passes through an elongated bronze bearing 54 and since that vertical shaft, which is an extension of finger 28, enters through the base 30, it is a simple matter to prevent water from entering or freezing along the shaft. Arm 56 is secured to shaft 52 and moves with it, causing an arcuate movement of cam 50. Shaft 52 can be retained against vertical movement by a shoulder 53 and sealing means may also be provided.

In operation of the entire system, the pipeline will be moved in one direction, say clockwise, around pivot point 10. If additional watering is needed, the direction can be reversed to then move counter-clockwise. The end carriage will move first, and when it does, it will carry along one end of the last length of pipe, causing a pivoting in the coupling of the next carriage. This pivoting will, in turn, cause saddle 22 to move arm 20 about its pivot point 18 moving finger 28 and shaft 52. Movement of shaft 52 causes an arcuate movement of arm 56 and cam 50 so that cam surface 57 will strike the roller of micro-switch arm 61, closing normally open (clockwise actuation) forward switch 46. Upon closing of this switch, the motor in that particular carriage will be actuated to propel the carriage in the clockwise or forward direction moving tha carriage so as to get it back in alignment with the end carriage. As soon as that movement is accomplished, cam surface 57 will no longer be swung far enough to contact micro-switch arm 61 and the motor will the be shut off. Of course, the movement of that particular tower will cause a similar mis-alignment in the next-inwardly positioned carriage so that the same sequence of events will be triggered in that carriage, and then the next-inwardly positioned carriage, etc., until all of the carriages have moved an appropriate amount to get the pipe back in suitable alignment as a result of the initial movement of the end carriage. The micro-switches, of course, control suitable relays which, in turn, switch the line voltages going to the motors. Such arrangements are conventional and need not be described in detail here. The electrical connections are made on terminal board 62 which is kept dry and trouble-free since it is enclosed within the cover 36 previously described.

If, for any reason, a particular carriage should move entirely too far out of line so as to endanger the entire system, then one of the cam surfaces 64 will strike micro-switch arm 66 of normally closed (overtravel limit) switch 48 and that switch will kill the entire system, that is all of the motors, and shut off the water supply also. Thus, each tower has its own safety switch in order to prevent extensive damage to the system.

When the sprinkler is travelling in the counter-clockwise direction, of course, the reverse operation is true, that is, the cam plate 50 will move upwardly as shown in FIG. 5 so that the cam surface 58 will strike the roller of micro-switch arm 60 and close switch 44 which is the actuation switch for the counter-clockwise or reverse direction. The spacing between cam surface 58 and the roller of arm 60 is less than the space between cam surface 64 and the roller of arm 66 so that switch 48 will not normally be opened unless the action of switch 44 fails to accomplish the desired results, that is getting that particular carriage back into proper alignment. The same is true of the relationship for the forward or clockwise direction, that is the distance between cam surface 57 and the roller of arm 61 is less than the distance between cam surface 64 and the roller of arm 66.

The operation of the entire system will be best understood from an analysis of FIG. 8 which shows the wiring diagram. In that diagram, a three-phase power supply is brought in on conductors 71–73 and a grounding conductor 74 is also brought into the pivot control panel which is within the dotted lines on the left side of the figure. That control panel contains a forward direction contactor 75 and a reverse direction contactor 76. Either a forward direction of operation or a reverse direction of operation is selected by selector switch 77 which also has a center-off position. After the direction of operation is selected, starter button 78 is pushed, in order to feed phase 2 to the top of relay holding coils 80 and 81 and to feed phase 1 (through contact 79) to the bottom of holding coils 80 and 81. Depending upon the position of selector switch 77, either contactor 75 or contactor 77 will be closed, supplying three-phase power to the contactors in each of the carriages which control the current flow to the motors of their respective carriages. When the forward mode is selected, then holding coil 80 not only closes contactor 75 but also switch 91 which feeds each of the forward micro-switches 46. Similarly, if the reverse (counter-clockwise) mode is selected, then when holding coil 81 is energized it not only closes switch 76 but also switch 93 which feeds each of the reverse micro-switches 44.

A typical intermediate control panel has, as previously described, a cam actuation plate 50, a forward control micro-switch 46, a reverse control micro-switch 44, both being normally open, and a normally closed overtravel limit switch 48. If all of the carriages are in proper alignment, then none of the intermediate control contactors 82 will be actuated and consequently none of the intermediate motors 83 will run. However, as soon as one of the main contactors 75 or 76 in the pivot control panel is actuated, there will be current to the timer T and the water valve V so that water will start to run and the timer can actuate switch 84 so as to furnish current to the contactor 86 in the end control panel. This contactor will actuate switch 88, closing the circuit to end carriage motor 90. As this motor runs, it will move the distal end of the pipe in an arcuate path, moving either clockwise or counter-clockwise depending upon the selection of either contactor 75 or 76 in the pivot control panel. The movement of the distal end of the pipe will, of course, cause mis-alignment in the coupling in the next-inwardly positioned carriage, moving its cam plate 50 to contact the arm of micro-switch 46 (assuming clockwise movement) which will, in turn, actuate relay 82 of that particular carriage, closing the switch to the motor 83 of that particular carriage so as to furnish current to it. The direction of rotation of that motor will, of course, be determined by the selection of either contactor 75 or 76 in the pivot control panel. The timer T can be set to run the system for a given interval of time, say several hours, and during that period, the end carriage motor will run continuously and the motors of the intermediate carriages will run intermittently as needed so as to keep each carriage in proper alignment. Obviously, the carriages closer to the end carriage will run more frequently or for longer periods of time. For safety, a grounding conductor 74 is carried through to all of the carriages and each carriage has a suitable fuse or overload device 92 in its circuit.

Turning now to the operation of the "kill" or over-travel limit devices, each intermediate control panel has a micro-switch 48 as previously described. Relay 80 or 81 (whichever one is in operation) is held in place by current which is supplied from phase 2 by a conductor 94 which returns from the end carriage and runs back through each of the switches 48, hooked in series, so as to supply holding current to relays 80 and 81. Thus, if any one of the switches 48 is opened, or the over-current device 92 of the end control panel is opened, relays 80 or 81 will drop out, causing the main switch to open, resulting in all of the motors being stopped and the closing of water valve V. It is then necessary to find the trouble and remedy it before normal operation of the machine can be resumed.

In addition, a hand-automatic switch 96 is provided so that the system may be operated without the water being turned on if desired. That is, the start button closes switches 78 and 79 which are momentary contact devices and used only for starting purposes. Thus, the only normal circuit from phase 1 to the bottom of holding coil 80 or 81 is through pressure switch 98. If it is desired to operate the machine without the water pressure turned on, then hand-auto switch 96 can be closed so as to energize the bottom of the holding coils.

In order to define a complete working device, a particular preferred embodiment has been described. Modifications thereof are, of course, contemplated, for example the arm 20 could be secured to the first pipe without any central pivot and the end of the arm would engage the switch actuation finger by a narrowed portion projecting into a closed loop of the finger. Thus, the scope of this invention is limited only by the apended claims.

What is claimed is:

1. A control for a self-propelled sprinkling system having a plurality of pipes supported on a plurality of motor driven carriages with couplings joining adjacent pipe ends, said control comprising a rigid arm bridging a coupling connecting a first pipe to a second pipe, said arm being pivotally mounted about a substantially vertical axis adjacent the coupling, said arm being operatively connected at one side of said axis to said first pipe for movement of the arm about the axis in response to pivotal movement of said first pipe relative to said axis, switch means mounted to said second pipe for starting and stopping a motor, said switch means having actuation means operatively connected to said arm at the opposite side of said axis for causing said switch means to start and stop the motor in response to relative movement of the first and second pipes about said axis.

2. The control of claim 1 in which the arm is pivoted above the coupling and has a "U" shaped brace on one end contacting said first pipe and a connector on the other end permitting lost motion in the vertical direction contacting said actuation means.

3. The control of claim 1 in which the arm is pivoted about the coupling and has an upright "U" shaped brace at said one side of said axis straddling the sides of said first pipe.

4. The control of claim 1 in which the arm extends in substantial alignment with the center line of the coupling and has no protrusion beyond the outer periphery of the coupling.

5. The control of claim 1 in which the substantially vertical axis is centered on the coupling.

6. The control of claim 1 in which the switch has an enclosure, the actuation means is a lever having a first portion engaging said arm, a second portion at an angle to the first portion and passing through the enclosure of the switch means, a third portion at an angle to said second portion and having cam means positioned to actuate at least one electrical switch.

7. The control of claim 6 including adjustable alignment means between said arm and lever.

8. The control of claim 6 in which said lever passes through the bottom of said enclosure.

9. The control of claim 6 in which the cam means is of a flattened "U" shape with each leg thereof positioned to actuate a switch, one connected for forward movement and one connected for reverse movement, and the bight thereof positioned to actuate an overtravel limit switch.

10. The control of claim 6 in which said enclosure has a water-tight non-metallic cover fitted to a base having a tapered edge.

11. The control of claim 6 in which said switching means is two normally open switches and said cam means is positioned to close one of them at a given time.

12. The control of claim 11 including an overtravel limit switch connected to shut off the entire system.

13. A control for maintaining pipe alignment in a self-propelled sprinkling system having a plurality of pipes supported above the ground on a plurality of motor driven carriages with couplings joining adjacent pipes, said control comprising:

a. a rigid arm bridging over a coupling connecting a first pipe to a second pipe, said arm being pivotally mounted about a substantially vertical axis adjacent the coupling, said arm being operatively connected at one side of said axis to said first pipe for movement of the arm about the axis in response to pivotal movement of said first pipe relative to said axis, b. a switch enclosure mounted on said second pipe;

c. switch means in said enclosure connected to start and stop a motor connected to drive the supporting carriage;

d. a pivotally mounted vertical shaft passing through the bottom of the enclosure having an outward portion engaging said arm at the opposite side of said axis and an inward portion carrying a cam positioned to contact said switch means;

e. an overtravel limit switch within said housing connected to stop the entire system and positioned to be actuated by said cam when engagement with said switch means has failed to correct the pipe alignment.

14. The control of claim 13 including a connector between said arm and said outward portion comprising an end on said arm with means for adjustably moving it in relation to the arm and an elongated slot therein, a bent over segment on said outward portion projecting into said slot.

15. The control of claim 13 in which the switch means is two normally open micro-switches, one positioned to be actuated by cam movement resulting from pipe mis-alignment in the forward direction and the other positioned to be actuated by pipe misalignment in the reverse direction, each being connected to actuate a relay controlling the flow of current to the motor of the supporting carriage.

16. The control of claim 13 in which the arm is pivoted about said axis from a bracket secured to one of the pipes and extending over the coupling which is bridged over by said arm.

17. The control of claim 13 including means on the arm for engaging said first pipe, comprising a vertically extending "U" shaped brace having clearance above and below said first pipe so that only horizontal movement of the frst pipe causes movement of the arm.

18. The control of claim 13 in which said enclosure has a water-tight non-metallic cover fitted to a base having a tapered edge.

* * * * *